United States Patent [19]
Nordlöf

[11] 3,969,673
[45] July 13, 1976

[54] PERSONAL RADIO STATION

[75] Inventor: Karl Gustav Gösta Lennart Nordlöf, Skarholmen, Sweden

[73] Assignee: AB Teleplan, Solna, Sweden

[22] Filed: Oct. 19, 1973

[21] Appl. No.: 407,819

[52] U.S. Cl. ................................ 325/16; 325/355; 325/390; 325/314
[51] Int. Cl.² ............................................ H01B 1/38
[58] Field of Search ............... 325/15, 16, 111, 117, 325/355, 356, 312, 4, 66, 118, 102, 183, 309, 314, 390, 391; 317/101 R; 179/100.11

[56] References Cited
UNITED STATES PATENTS

| | | | |
|---|---|---|---|
| 2,959,644 | 11/1960 | Grace | 325/66 |
| 3,059,184 | 10/1962 | Germain | 317/101 R X |
| 3,364,487 | 1/1968 | Maneux | 343/702 |
| 3,370,236 | 2/1968 | Walker | 325/16 |
| 3,569,788 | 3/1971 | Niblack | 325/15 |
| 3,702,480 | 11/1972 | Byars | 343/906 X |
| 3,826,986 | 7/1974 | Brown et al. | 325/16 |

OTHER PUBLICATION

AGA PUBLICATION, Bruksanvisming for barbar radiostation, March 71.

*Primary Examiner*—Benedict V. Safourek
*Assistant Examiner*—Aristotelis M. Psitos
*Attorney, Agent, or Firm*—Spencer & Kaye

[57] ABSTRACT

A remote control unit of a portable personal radio station, said remote control unit being provided with a microphone, a loudspeaker, a transmit/receive switch, an aerial and contact means. All these devices are mounted in a housing which either acts as the control unit of the personal radio station or as a plug-in unit by which all functions of the station may be transferred to an auxiliary set, which for example may be mounted within a car. It is then possible to operate the station from said auxiliary set without need for the operator to release the personal radio station from the shoulder bag within which the station is carried. When the operator enters the car he just plugs the housing into a socket member provided in the front panel of said auxiliary set and the station is then controlled from controls on the panel of said auxiliary set.

8 Claims, 2 Drawing Figures

U.S. Patent   July 13, 1976   3,969,673
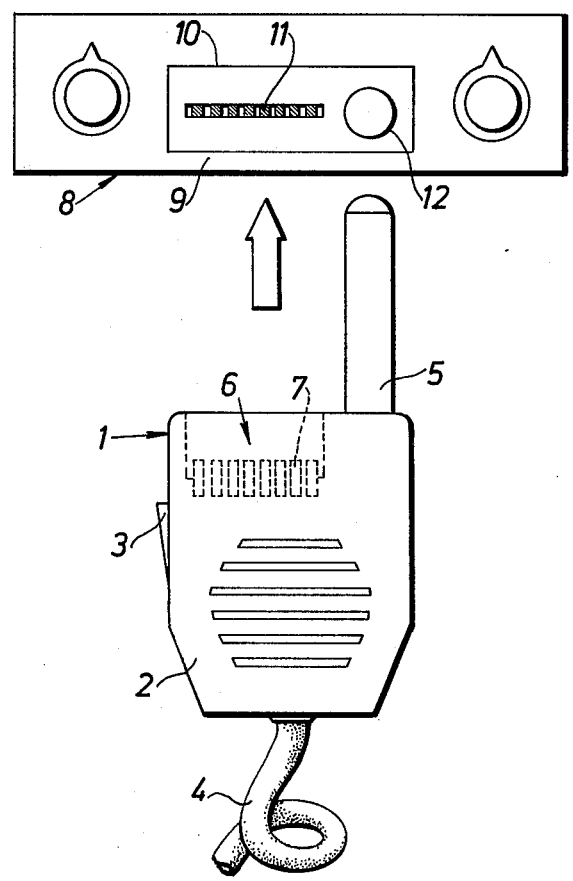
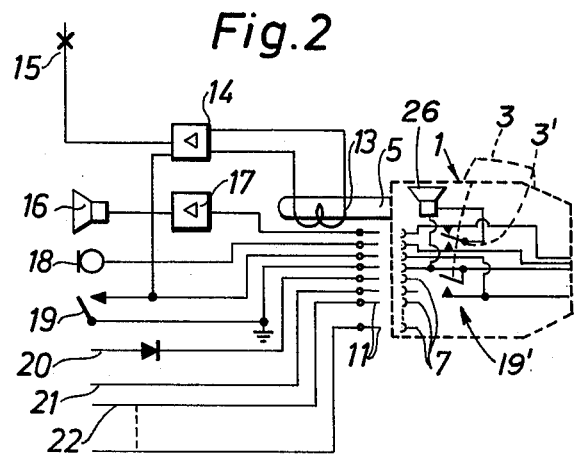

PERSONAL RADIO STATION

BACKGROUND OF THE INVENTION

The present invention relates to a device in a portable personal radio station which may be remote controlled from an external auxiliary set which for example may be mounted within a vehicle.

A personal radio station known in the art is carried for example by a policeman in a satchel or shoulder bag. The station is controlled from a remote control unit which for example may be attached to the coat lapel and which comprises a housing of such a small size that it is held in the hand. The housing may for example comprise a microphone, a loudspeaker and a transmit/receive switch.

When the policeman is going by car the personal radio station is connected to an auxiliary set mounted in the car. Said auxiliary set may for example comprise a car radio aerial, power amplifying units, a transmit/-receive switch mounted in the steering wheel, a loudspeaker and a microphone both being stationary mounted within the car, channel selection knobs which together with other controls, as for example volume control and devices for tone selective calls etc., are mounted on a panel.

The personal radio station is connected to the auxiliary set in the following manner: the policeman releases the personal radio station from his shoulder bag and the station is placed in a cartridge provided with a control panel from which it is now possible to operate the personal radio station.

However, this way to connect the station to the auxiliary set is very inconvenient because the station must first be released from the shoulder bag and thereafter the station, which may be comparatively heavy, must be carefully placed in the cartridge in a predetermined position.

SUMMARY OF THE INVENTION

There is an object of the present invention to eliminate this drawback and to provide a convenient, quick and reliable method for connecting the portable personal radio station to an external auxiliary set, which for example may be mounted within a car, from which the personal radio station then is remote controlled.

In accordance with one aspect of the invention there is provided a remote control unit for controlling a number of predetermined functions (as, for example, microphone function, loudspeaker function and transmit/receive switching) of a portable personal radio station comprising transmitter and receiver units, said remote control unit being mounted in a housing provided with a projecting aerial, said housing being intended to be carried in the hand or attached to a coat lapel. In accordance with this aspect of the invention the remote control unit comprises contact means mounted within said housing, said contact means permitting control of a desired number of functions (as, for example, the microphone function, loudspeaker function, transmit/receive switching, channel selection, battery charging, tone selective calls etc.) of the personal radio station from an external auxiliary set, said contact means together with said aerial forming a plug-in unit for connecting the personal radio station to said external auxiliary set.

In accordance with another aspect of the invention there is provided an auxiliary set, for example mounted within a car, intended to be used together with the remote control unit. The auxiliary set is provided with a number of function and/or control units (for example, microphone, loudspeaker, transmit/receive switch, channel selector, volume control etc.) for those functions of the personal radio station which are desired to be remote controlled from said auxiliary set. The auxiliary set is characterized by socket means mounted in a panel thereof and being intended for receiving said plug-in unit, said socket means comprising a contact member for receiving said contact means and an aperture for said aereal.

By inserting the plug-in unit into the panel it is thus possible for the policeman to operate the personal radio station from the auxiliary set without the need to release the personal radio station from the shoulder bag.

BRIEF DESCRIPTION OF THE DRAWINGS

An embodiment of the invention will be described in connection with the attached drawings in which:

FIG. 1 shows a plug-in unit and socket means in accordance with the present invention, and FIG. 2 is a simplified circuit diagram of those functions which may be remote controlled from said auxiliary set after insertion of the plug-in unit into the socket.

DESCRIPTION OF THE PREFERRED EMBODIMENT

A personal radio station, not shown, is for example carried in a shoulder bag at the waist and is controlled by a remote control unit 1. The number of functions which are remote controlled may theoretically be any desired number. The remote control unit comprises a housing 2 of such a small size that it generally may be held in the hand. The back wall, not shown, of the housing may be provided with fastening strips for attaching the remote control unit to the clothes, for example a coat lapel. A microphone and a loudspeaker 26 is mounted within the housing shown in FIG. 1. Further there is a transmit/receive switch 3 provided on one of the side walls of the housing. A cable 4 connects the remote control unit with a personal radio station having a transmitter and a receiver. The personal radio station may operate in the UHF or VHF frequency region. An aerial 5 of the helix type is provided on the upper wall of the housing. The length of the aerial is about 3.15-3.94 inches and the aerial comprises a copper helix coated with rubber or the like. Contact means 6 are built-in in the upper wall of the housing. Said contact means comprises a number of contact members 7 (in the drawing there is shown 8 such contact members) permitting remote control of the radio station from an external auxiliary set 8. Any desired number of functions may be remote controlled. Contact means 6 may for example comprise a card contact having female contact members. The aerial 5 together with contact means 6 form a plug-in unit for the personal radio station. Said plug-in unit is intended for insertion into an auxiliary set 8 having a socket 10 in a panel 9, said socket being adapted to receive the plug-in unit. The auxiliary set may for example be mounted within a vehicle. Said socket 10 comprises contact members 11 for receiving contact means 6 and an aperture 12 for receiving aerial 5 is provided in said panel. Contact members 11 may for example comprise a card contact provided with male type contacts for receiving said female contacts 7. Around the inside of said aperture there is provided a helix 13 (compare FIG. 2) which via a power amplifier 14 shown in FIG. 2 (and belonging to the auxiliary set) by induction connects aerial 5 to an external aerial, for example a car radio aerial 15. The auxiliary unit shown in FIG. 1 is provided with controls for volume etc. and controls, not shown, for channel selection.

When the remote control unit 1 is attached to the coat lapel it serves as loudspeaker, microphone and transmit/receive switch. However, when the same remote control unit 1 serves as a plug-in unit, i.e. when it is inserted in socket 10, said loudspeaker, microphone and transmit/receive switch functions are taken over by corresponding controls of the auxiliary set. Upon insertion of the remote control unit 1, functions other than those indicated above also are taken over by the auxiliary set. For this purpose, unit 1 can contain circuitry identical to that associated with a set of external contacts in one of the portable radio stations of the PU-Series manufactured and sold by the Swedish firm AGA Aktiebolag, having offices in Stockholm and other cities.

As appears from the simplified circuit diagram shown in FIG. 2 the auxiliary set may also provide such facilities as, for example, charging the accumulator of the personal radio station from the accumulator of the car over input 20, tone selective calling over input 22 etc. Further, the stationary auxiliary set is provided with an amplifier 14, aerial 15, a stationary loudspeaker 16 supplied from a power amplifier 17, a microphone 18 and a transmit/receiver switch 19 mounted in the steering wheel. The number of functions of the personal radio station to be remote controlled from the auxiliary set is variable and need not be chosen in accordance with any particular rule.

The above described embodiment of the invention may in many ways be varied and modified within the scope of the present invention.

What I claim is:

1. In a personal radio system having a portable set composed of first housing means containing a transmitting unit and a receiver unit, and a remote control unit for controlling a plurality of different functional operations of the system, the system also including an external auxiliary control unit arranged to be permanently mounted in a support structure, the improvement wherein said remote control unit comprises: a second housing means of a size so as to be capable of being hand held; a flexible cable extending between said first and second housing means to connect said remote control unit to said transmitting and receiver units; an aerial connected to said second housing means and projecting therefrom; and function control means for controlling the different functions of said system, said remote control unit includes contact means mounted within said second housing means and coupled to said function control means, and said auxiliary control unit includes mating contact means for selectively coupling the receiver and transmitter units to said external auxiliary control unit for enabling the different functions of the radio system to be controlled by said external auxiliary control unit, whereby said contact means and said aerial on said second housing means form a plug-in unit for coupling the portable set to said external auxiliary control unit.

2. A system as claimed in claim 1, wherein said function control means of said remote control unit is disconnected upon insertion of said contact means of said remote control unit into said external auxiliary control means unit, when said remote control unit serves as a plug-in unit.

3. A system as claimed in claim 1, further comprising: a microphone, a loudspeaker and a transmit/receive switch, all of which are mounted within said second housing means; wherein said function control means controls the functional operation of said microphone, loudspeaker and transmit/receive switch so as to be utilized with the personal radio station when said second housing means is carried in the hand, whereby said remote control unit serves as a control unit of the personal radio system.

4. A system as claimed in claim 1, wherein said contact means includes a card contact member provided with female contact members.

5. An auxiliary control set for use with a portable personal radio system having a receiver unit and a transmitting unit both mounted in a housing, and a remote control unit connected to the receiver and transmitting units by a flexible cable, the remote control unit including contact means and an aerial projecting externally from the remote control unit, and the contact means and the aerial forming a plug-in unit, said auxiliary control set comprising: a mounting panel; a plurality of function control units for controlling a plurality of different functions of the personal radio station which are to be remote controlled from said auxiliary set; socket means mounted in said mounting panel of said auxiliary set for receiving the plug-in unit, said socket means including a contact member for receiving the contact means and an aperture for receiving the aerial.

6. An auxiliary set as claimed in claim 5, further comprising: power amplifying means and a separate external aerial, both said amplifying means and said separate external aerial being operative to amplify the transmission power and a receiving sensitivity of the personal radio system.

7. An auxiliary set as claimed in claim 5, wherein said contact member includes a plurality of male contact elements.

8. An auxiliary set as claimed in claim 7, further comprising: a winding wound around the inside of said aperture and operative to inductively couple the aerial of the personal radio system to said external aerial.

* * * * *